(12) United States Patent
Winder et al.

(10) Patent No.: US 12,535,013 B2
(45) Date of Patent: Jan. 27, 2026

(54) GAS TURBINE ENGINE WITH CARBON/CARBON COMPOSITE PISTON SEAL

(71) Applicant: RAYTHEON TECHNOLOGIES CORPORATION, Farmington, CT (US)

(72) Inventors: Calvin Jay Winder, Cromwell, CT (US); Fadi S. Maalouf, East Hampton, CT (US); Matthew E. Bintz, West Hartford, CT (US); Peter T. Schutte, Manchester, CT (US); Justin Roger DeLarm, Bolton, CT (US); Pieter Van Lieu, Cheshire, CT (US); Hamidreza Mohseni, Avon, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/994,182

(22) Filed: Nov. 25, 2022

(65) Prior Publication Data

US 2024/0175369 A1 May 30, 2024

(51) Int. Cl.
 *F01D 11/00* (2006.01)
(52) U.S. Cl.
 CPC ...... *F01D 11/003* (2013.01); *F05D 2240/581* (2013.01); *F05D 2300/603* (2013.01)
(58) Field of Classification Search
 CPC ............ F01D 11/003; F05D 2240/581; F05D 2300/603
 See application file for complete search history.

(56) References Cited

U.S. PATENT DOCUMENTS

| | | | |
|---|---|---|---|
| 9,945,295 B2 | 4/2018 | Porter et al. | |
| 2012/0104300 A1* | 5/2012 | Dowd | F16K 25/005 251/305 |
| 2013/0051993 A1 | 2/2013 | Webb | |
| 2014/0154053 A1* | 6/2014 | Roberts | F02C 7/28 415/121.3 |
| 2018/0291815 A1 | 10/2018 | Munson et al. | |
| 2020/0148340 A1 | 5/2020 | Poteet et al. | |
| 2020/0318489 A1 | 10/2020 | Webb | |
| 2021/0114881 A1* | 4/2021 | Ivanov | C04B 35/83 |
| 2022/0259975 A1 | 8/2022 | Heyerman | |

FOREIGN PATENT DOCUMENTS

| | | |
|---|---|---|
| CN | 101954676 | 1/2011 |
| CN | 104500743 | 4/2015 |
| DE | 102016113198 | 1/2018 |
| DE | 102017130965 | 6/2019 |
| RU | 2646063 C1 * | 3/2018 |

OTHER PUBLICATIONS

European Search Report for European Patent Application No. 23210937.1 mailed Apr. 3, 2024.

* cited by examiner

*Primary Examiner* — Gilbert Y Lee
(74) *Attorney, Agent, or Firm* — Carlson, Gaskey & Olds, P.C.

(57) ABSTRACT

A gas turbine engine includes a rotor that that has a seal surface, a shaft that has an annular seal channel that opens to the seal surface, and a seal disposed in the annular seal channel for sealing against the seal surface. The seal is made of a composite having carbon fibers disposed in a carbon matrix.

15 Claims, 4 Drawing Sheets

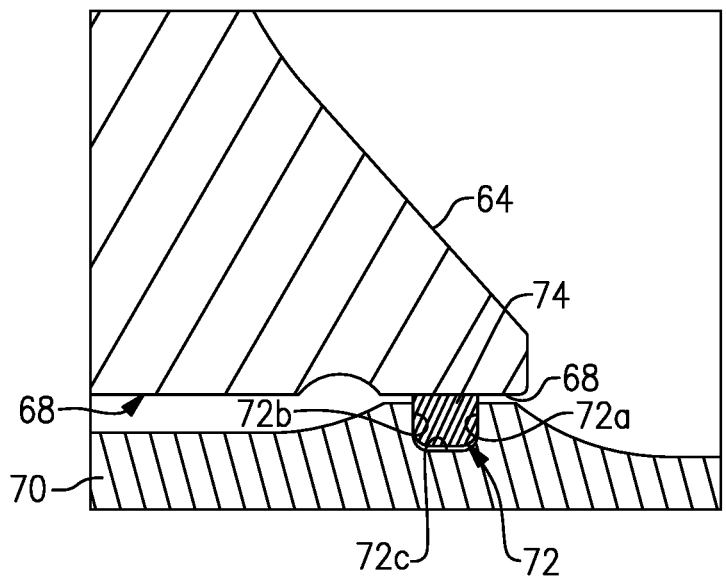
FIG.2
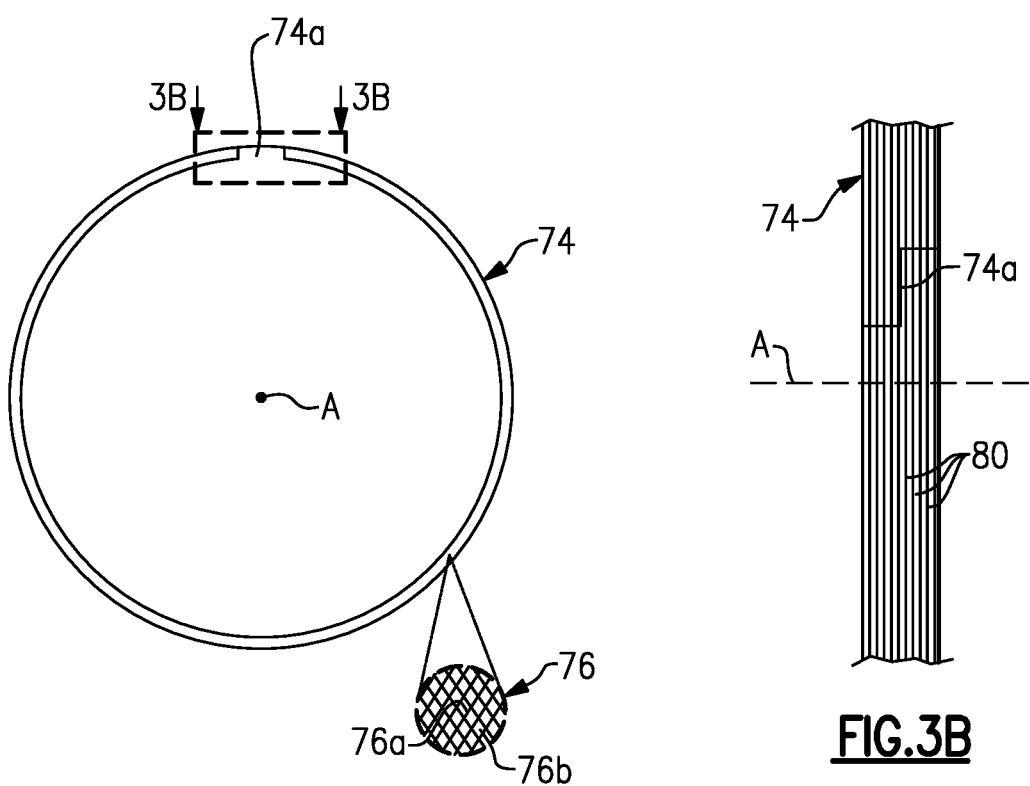
FIG.3A
FIG.3B

GAS TURBINE ENGINE WITH CARBON/CARBON COMPOSITE PISTON SEAL

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

A speed reduction device, such as an epicyclical gear assembly, may be utilized to drive the fan section such that the fan section may rotate at a speed different than the turbine section. In such engine architectures, a shaft driven by one of the turbine sections provides an input to the epicyclical gear assembly that drives the fan section at a reduced speed.

SUMMARY

A gas turbine engine according to an example of the present disclosure includes a rotor rotatable about an engine central axis and defining a seal surface, a shaft rotatable about the engine central axis, the shaft defining an annular seal channel that opens to the seal surface, and a seal disposed in the annular seal channel for sealing against the seal surface, the seal being made of a composite having carbon fibers disposed in a carbon matrix.

In a further embodiment of the foregoing embodiment, the seal is a split or segmented ring.

In a further embodiment of any of the foregoing embodiments, the seal has a multi-layer configuration of fiber plies in a stacked arrangement.

In a further embodiment of any of the foregoing embodiments, the fiber plies are substantially perpendicular to the engine central axis.

In a further embodiment of any of the foregoing embodiments, the carbon fibers are, by volume, 35% to 65% of the composite.

In a further embodiment of any of the foregoing embodiments, the carbon fibers and the carbon matrix are graphite.

In a further embodiment of any of the foregoing embodiments, the composite includes an oxidation inhibitor.

A further embodiment of any of the foregoing embodiments includes a compressor section, a combustor in fluid communication with the compressor section, and a turbine section in fluid communication with the combustor, wherein the rotor and seal are in the compressor section.

A method of assembling the seal into the gas turbine engine according to an example of the present disclosure includes installing the seal into the annular seal channel, and diametrically compressing the seal to a compressed state in which the seal seats onto the channel floor.

A further embodiment of any of the foregoing embodiments includes an adhesive securing the seal in the compressed state.

In a further embodiment of any of the foregoing embodiments, the adhesive is in an interface between the seal and a floor of the annular seal channel.

In a further embodiment of any of the foregoing embodiments, the seal has a multi-layer configuration of fiber plies in a stacked arrangement.

In a further embodiment of any of the foregoing embodiments, the carbon fibers and the carbon matrix are graphite.

In a further embodiment of any of the foregoing embodiments, the carbon fibers are, by volume, 35% to 65% of the composite.

In a further embodiment of any of the foregoing embodiments, the composite includes an oxidation inhibitor.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 2 illustrates a seal between a rotor and a shaft.

FIG. 3A illustrates an axial view of a seal.

FIG. 3B illustrates a radial view of the seal.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
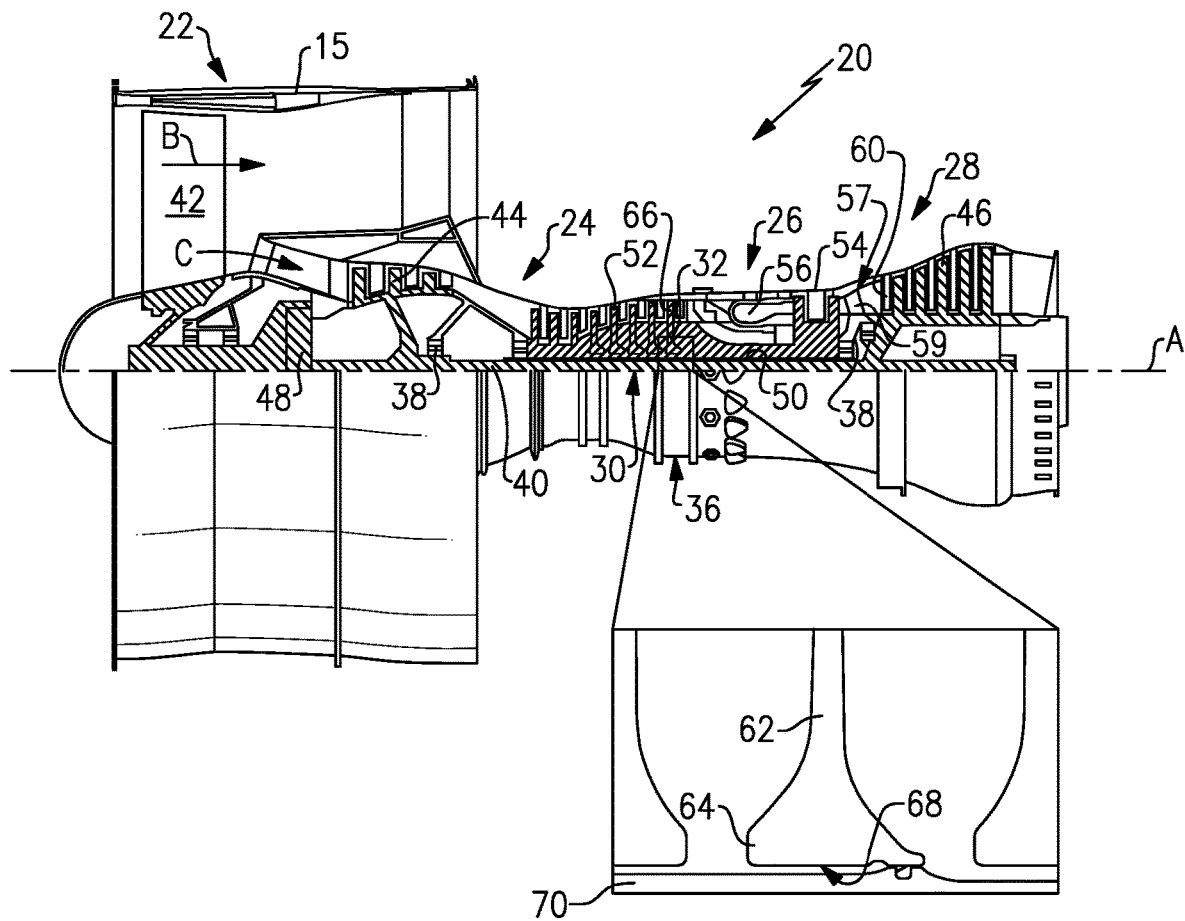
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of [(Tram ° R)/(518.7° R)]0.5. The "Low corrected fan tip speed" as disclosed herein according to one non-limiting embodiment is less than about 1150.0 ft/second (350.5 meters/second), and can be greater than or equal to 1000.0 ft/second (304.8 meters/second).

The high pressure compressor 52 includes a rotor 62 that has a portion 64 (shown in FIG. 1 inset). In this example, the rotor 62 carries rotor blades 66, which may be integral with the rotor 62 or mechanically attached to the rotor 62. It is to be understood, however, that in other examples the rotor 62 may not have blades. The portion 64 defines a seal surface 68. In this example, the seal surface 68 is in a central bore of the rotor 62, but it could alternatively be on a flange or arm that extends from the rotor 62. A shaft 70 extends through the bore. The shaft 70 may be part of the high speed spool 32. The rotor 62 and the shaft 70 are rotatable in the same direction about the engine central axis A.

FIG. 2 illustrates a sectioned view taken in a plane that includes the axis A. The shaft 70 defines an annular seal channel 72. The channel 72 has fore and aft channel sides 72a/72b, a channel floor 72c, and a top that opens to the seal surface 68. There is a seal 74 disposed in the channel 72 for sealing against the seal surface 68. The seal 74 may also be considered to be a piston seal. When the engine 20 is running, there is a pressure differential between the upstream and downstream regions of the rotor 62. The seal 74 facilitates isolating those pressure regions from each other.

FIG. 3A shows an axial view of the seal 74, and FIG. 3B shows a sectioned view of a representative portion of the seal 74. The seal 74 is a ring and includes one or more seams 74a. In the illustrated example, the seal 74 includes only one seam 74a and may thus be considered to be a split ring. Alternatively, the seal 74 may be segmented by two or more seams 74a and thus include two or more pieces that, when assembled, form a ring. The seam 74a shown is a lapjoint but it is to be understood that other type of seam joints may be used, such as but not limited to butt joints and scarf joints.

The seal 74 is made of a composite 76 (inset FIG. 3A) having carbon fibers 76a disposed in a carbon matrix 76b. For example, the fibers 76a and the matrix 76b are substantially pure graphite, and the carbon fibers 76a are, by volume, 35% to 65% of the composite 76. The remainder of the volume of the composite 76 is made up by the matrix 76b and porosity. The composite 76 may also include an oxidation inhibitor wash 78 to facilitate oxidation resistance of the graphite. For example, the oxidation inhibitor wash 78 is mono-aluminum-phosphate. The oxidation inhibitor wash 78 is infiltrated into pores of the composite 76 to coat and protect the graphite. In this regard, substantially higher volume percentages of the fibers 76a may inhibit infiltration, while substantially lower volume percentages may make the composite 76 weak.

The seal 74 in this example has a multi-layer configuration of fiber plies 80 in an axially stacked arrangement (FIG. 3B). The plies 80 may be, but are not limited to, woven fabric sheets, unidirectional sheets, and non-woven sheets. The fiber plies 80 are arranged back-to-back such that the plies 80 are substantially parallel to each other and perpendicular to the engine central axis A. As will be appreciated, the plies 80 may deviate by a few degrees from perpendicular due to waviness or dimensional tolerances of the plies 80, for example. The surfaces of the seal 74 may be machined or otherwise treated to give the seal 74 a desired geometry and finish.

The seal 74 is installed into the channel 72 by initially diametrically expanding the seal 74. For instance, the ends of the seal 74 at the split seam 74a are moved apart, thereby enlarging the seal 74 and enabling it to fit over the shaft 70 into the channel 72. Although the composite 76 is somewhat stiff, the radial height and axial width of the seal 74 are thin and allow the seal 74 to flex when the ends are moved apart. For instance, the seal 74 is up to 0.5 inches in radial height and 0.5 inches in axial width. The deformation of the seal 74 is within the elastic regime and the seal 74 thus springs back to closed once in the channel 72 is in a state of rest with no forces applied such that the ends again meet at the split seam 74a.

Figure 4A:
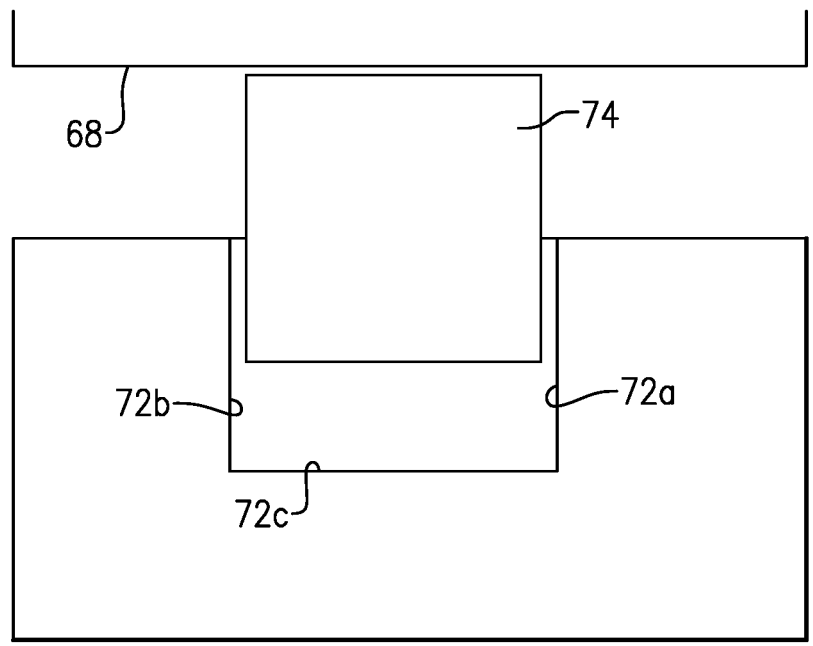
FIG. 4A illustrates a seal after installation into a seal channel, where the seal is unseated and in a state of rest.
Figure 4B:
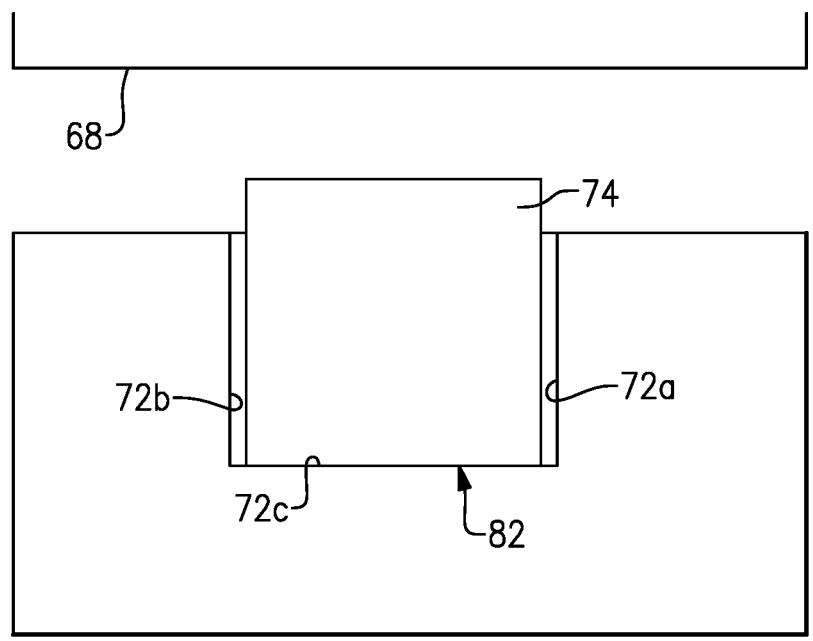
FIG. 4B illustrates the seal after diametric compression to seat the seal.

FIG. 4A shows the seal 74 in the state of rest in the channel 72. The seal 74 is diametrically oversized for the channel 72 such that in the state of rest the seal 74 is unseated with respect to the channel floor 72c. The seal 74 is then diametrically compressed to a compressed state, as shown in FIG. 4B, such that the seal 74 seats onto the channel floor 72c. The seated position provides clearance for the shaft 70 to be received into the bore 68 during installation without the seal 74 "catching" on the side of the hub 62.

The seal 74 is compressed by moving the ends of the seal 74 in the split seam 74a closer together. The seal 74 may in some instances stay in the seated position if there is enough friction to resist springing to an expanded state. However, as the graphite is a low-friction material, an adhesive 82 may be needed between the seal 74 and the channel floor 72c to hold the seal 74 in the seated position. The adhesive 82 may be a polymeric material that degrades when exposed to engine operational temperatures such that the seal 74 releases and diametrically expands by its elastic springback into contact with the seal surface 68. The seal 74 is thus biased toward contact with the rotor 62 and is not reliant on pressures or forces to engage for sealing. Alternatively, the seal 74 may be diametrically fit to the channel 72 such that in the state of rest the seal 74 is seated with respect to the channel floor 72c. In that case, the seal 74 would initially seat and then expand under centrifugal forces to engage for sealing when the shaft 70 rotates.

Figure 5:
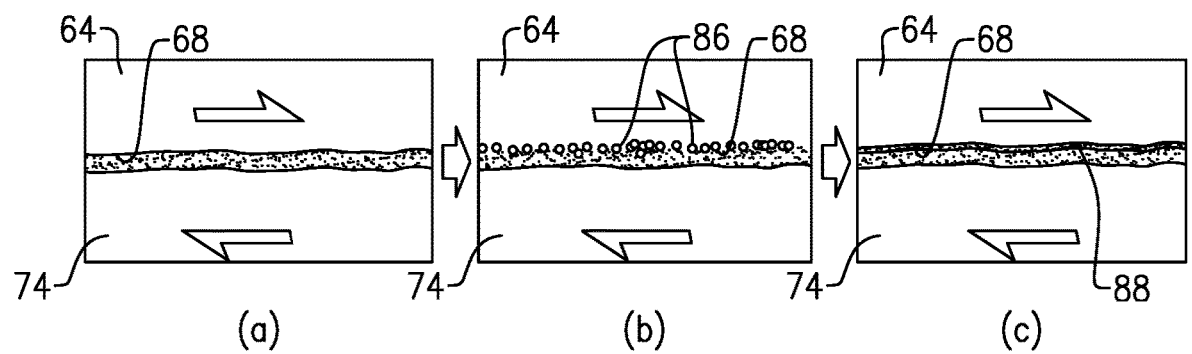
FIG. 5 illustrates a representative portion of a seal during engine operation.

FIG. 5 illustrates the seal 74 during engine operation. As shown in section (a), the seal 74 (which is rotating with the shaft 70) is in contact with the hub 64, which is rotating in the same direction. Across engines cycles and missions, however, there is relative movement between the seal 74 and the seal surface 68 of the rotor 62. Such movement may include axial, radial, and circumferential movement, for example. Initially there is abrasive wear between the seal surface 68 (of the portion 64 of the rotor 62) and the surface of the seal 74. As shown in section (b), the wear produces small particles 86, or powder, of graphite and/or amorphous carbon that can remain in the interface between the seal surface 68 and the surface of the seal 74. With continued sealing engagement, carbon from the particles 86 bonds with oxygen-containing groups on the surface of the seal 74 to form a lubricious film 88, as shown in section (c), which facilitates wear reduction of the seal surface 68 of the rotor 62 (which is made of a metallic alloy).

It is desirable to reduce wear on a rotor, as rotors are typically large, expensive components that cannot be easily repaired or replaced. Sealing between a shaft and a rotor, however, is particularly challenging in that regard. Even though the seal and the rotor are rotating in the same direction with no or substantially no relative rotational movement there between, the seal can shift through various engine cycles, potentially wearing the rotor. The disclosed seal 74 is made of the carbon/carbon composite 76 and is low in weight/density. In comparison to a denser metallic seals, the seal 74 thus produces lower centrifugal forces against the rotor 62, thereby facilitating reductions in wear. Additionally, the seal 74 is highly lubricious in comparison to metallic seals, which may further facilitate wear reduction. For example, the lubricious film 88 may exhibit a film transfer mode of low wear.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A gas turbine engine comprising:
    a compressor section including a rotor rotatable about an engine central axis and defining a seal surface;
    a combustor in fluid communication with the compressor section;
    a turbine section in fluid communication with the combustor;
    a shaft interconnecting the turbine section and the rotor, the shaft being rotatable about the engine central axis, wherein rotation of the turbine section drives rotation of the rotor, the shaft defining an annular seal channel that opens to the seal surface; and
    a seal disposed in the annular seal channel for sealing against the seal surface, the seal being made of a composite having carbon fibers disposed in a graphite matrix, and the composite including an oxidation inhibitor, wherein the seal has a multi-layer configuration of fiber plies in a stacked arrangement, and the fiber plies are substantially perpendicular to the engine central axis.

2. The gas turbine engine as recited in claim 1, wherein the seal is a split or segmented ring.

3. The gas turbine engine as recited in claim 1, wherein the carbon fibers are, by volume, 35% to 65% of the composite.

4. The gas turbine engine as recited in claim 1, wherein the carbon fibers are graphite.

5. The gas turbine engine as recited in claim 1, wherein the rotor carries rotor blades.

6. The gas turbine engine as recited in claim 1, wherein the seal includes a split seam that is a lapjoint.

7. The gas turbine engine as recited in claim 1, wherein the graphite matrix is pure graphite.

8. The gas turbine engine as recited in claim 1, wherein the seal is diametrically oversized for the annular channel such that in the state of rest the seal is unseated with respect to a channel floor of the annular seal channel.

9. The gas turbine engine as recited in claim 1, wherein the oxidation inhibitor is mono-aluminum-phosphate.

10. The gas turbine engine as recited in claim 1, wherein the oxidation inhibitor is infiltrated into pores of the composite, coating the composite.

11. A method of assembling a seal into a gas turbine engine that has a rotor that includes a rotor that is rotatable about an engine central axis and that defines a seal surface, a shaft that is rotatable about the engine central axis and that defines an annular seal channel that opens to the seal surface, the method comprising:

installing the seal into the annular seal channel, the seal is made of a composite that has carbon fibers disposed in a graphite matrix, the composite includes an oxidation inhibitor, wherein the seal has a multi-layer configuration of fiber plies in a stacked arrangement, and the fiber plies are substantially perpendicular to the engine central axis, and the seal is initially oversized for the annular seal channel such that the seal, in a rest state, is unseated with respect to the channel floor; and diametrically compressing the seal to a compressed state in which the seal seats onto the channel floor.

12. The method as recited in claim 11, further comprising an adhesive securing the seal in the compressed state.

13. The method as recited in claim 12, wherein the adhesive is in an interface between the seal and a floor of the annular seal channel.

14. The method as recited in claim 11, wherein the carbon fibers are graphite.

15. The method as recited in claim 14, wherein the carbon fibers are, by volume, 35% to 65% of the composite.

* * * * *